United States Patent [19]

Dorph

[11] 4,051,617
[45] Oct. 4, 1977

[54] AUTOMATIC LINE RELEASE FOR SPIN FISHING EQUIPMENT

[75] Inventor: Thor Dorph, San Francisco, Calif.

[73] Assignees: Bjorn Lie; Gina Lie, both of Oslo, Norway; part interest to each

[21] Appl. No.: 723,930

[22] Filed: Sept. 16, 1976

[51] Int. Cl.² .............................................. A01K 87/00
[52] U.S. Cl. ...................................... 43/18 R; 43/23; 43/25
[58] Field of Search ...................... 43/23, 18 R, 25, 19

[56] References Cited

U.S. PATENT DOCUMENTS

| 206,264 | 7/1878 | Robertson | 43/23 |
| 1,351,473 | 8/1920 | Hardy | 43/18 R |
| 3,057,106 | 10/1962 | Wheeler | 43/25 |
| 3,436,858 | 4/1969 | Shaffer | 43/19 |

Primary Examiner—Warner H. Camp
Attorney, Agent, or Firm—Kemon & Estabrook

[57] ABSTRACT

An automatic line release mechanism is attached to a hollow handle of a spinning rod within which handle the rod is free to flex. The line release includes a pivotally mounted trigger which holds the line between the reel and the first line guide prior to making a cast. The trigger is automatically moved to a line releasing position by tension in the line and bending of the rod during casting. A cam locking means is released by a sliding bar member connected by a resilient wire to the rod within the hollow handle. The effective length of the wire is changed in response to flexure of the rod to unlock the trigger at the proper time in the cast.

5 Claims, 2 Drawing Figures

AUTOMATIC LINE RELEASE FOR SPIN FISHING EQUIPMENT

BACKGROUND OF THE INVENTION

An automatic line release mechanism of the type to which the present invention is addressed is disclosed and claimed in my prior U.S. Pat. No. 3,855,720 dated Dec. 24, 1974. The present invention is an improvement on the device of my earlier patent in that the means responsive to tension in the line and flexure of the rod is much more compact, easily adjustable and received entirely on and within a special hollow rod handle. In my prior patent, the release actuator operated as a free moving, un-strained structural fiber extending along a substantial length of the side of the rod in a location where the adjacent rod fibers are compressed and elongated because of the stress - strain relationship when the rod is alternately bent and straightened.

BRIEF SUMMARY OF THE INVENTION

Substantially the same trigger, cam and sliding bar arrangement of the above mentioned prior patent are employed in the present invention. The principal difference lies in the interconnection between the sliding bar and the rod. In the present invention, the rod handle is hollow and the rod itself is coaxially mounted within the hollow handle in such a way that it can flex therein. The sliding bar which moves in response to rod flexure to position the cam out of the path of movement of the trigger member in accordance with the present invention is connected to the rod by a short length of resilient wire at a position within the hollow handle.

DETAILED DESCRIPTION

Figure 1:
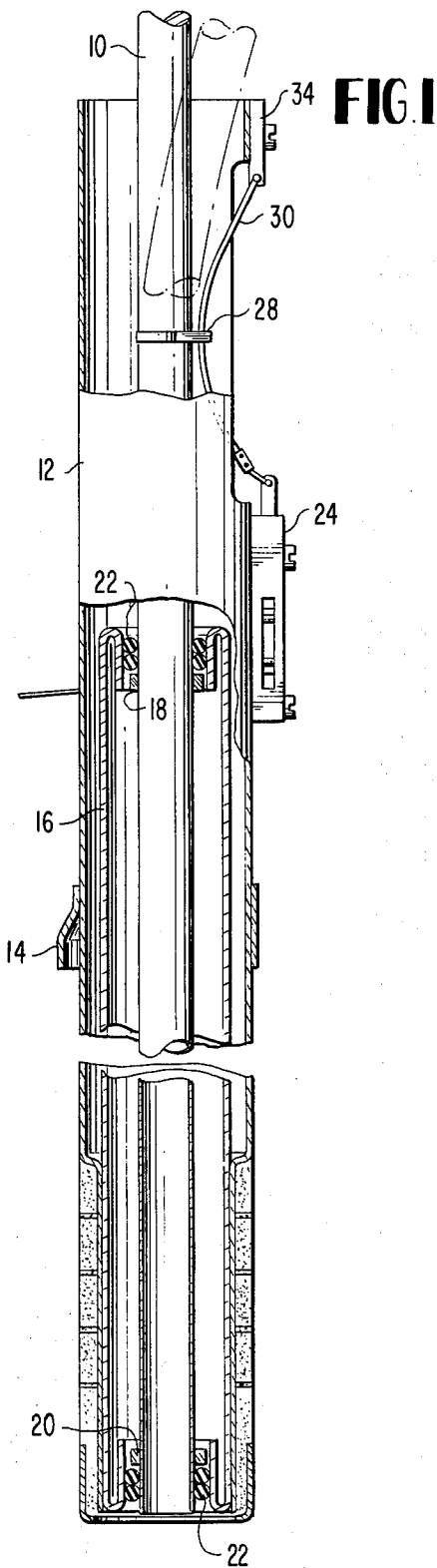
FIG. 1 is a side elevation partially in section showing a preferred embodiment of the present invention.
Figure 2:
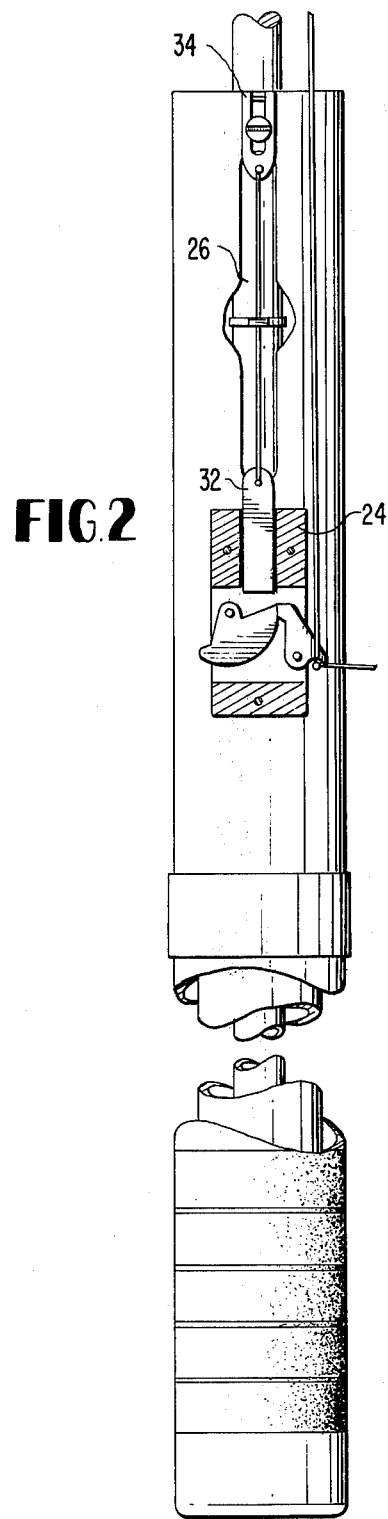
FIG. 2 is a plan view partially in section taken at 90° to the showing in FIG. 1.

Referring first to FIG. 1, the butt section of the rod 10 is shown coaxially mounted within a hollow handle 12. The handle 12 includes a reel seat of any conventional type and only the forward half thereof is shown at 14. In order to mount the rod for flexure within the hollow handle 12, it is secured at spaced points to an inner handle member 16 which fits snugly into the butt portion of the handle 12. A preferred mounting of the rod 10 within the inner handle 16 as shown in this figure includes a pair of spaced annular abutments 18 and 20 which are preferably cemented to the rod blank. O-rings 22 are then positioned in the annular space between the blank and the inner handle and an adhesive is then added such as a flexible rubber seal compound to completely plug up both ends of the inner handle. The inner handle may then be secured within the outer handle by any appropriate adhesive such for example as ordinary stick ferrule cement.

The length of the inner handle is selected to allow sufficient rod length to project beyond it toward the front end of the outer handle so that when the rod is fully bent (to its nominal breaking point) the rod will then barely make contact with the forward end of the outer handle. This will determine the maximum useable extension of the outer handle beyond the inner handle. Secondly, the diameter of the inner handle is selected merely to allow ample space for the rod to flex freely and unrestrictedly within the inner handle so that the entire length of the rod from tip to butt is available for energy storage and release during the casting process.

Secured to the hollow handle forwardly of and on the opposite side from the position occupied by the reel, is a housing 24 for the trigger, cam and sliding bar assembly all of which are adequately described in my aforementioned prior patent. Immediately forward of the housing 24, an elongated opening 26 is formed in the handle 12. At a point on the rod 10 substantially equidistant between the ends of the opening 26 is a saddle member 28 secured to the rod. The saddle 28 includes an aperture, sized to receive a resilient wire 30 and to permit free movement of the wire within the aperture. The rear end of the wire 30 is attached to the forward end of the sliding bar 32 and the opposite end of the wire 30 is attached to the forward end of the handle 12 by an adjustably positioned clamp 34. Preferably the attachment means for opposite ends of the wire member 30 are ball type joints permitting free movement of the ends of the wire with respect to the attachment points.

By contrast with the release actuator of the aforementioned prior patent, the resilient wire member 30 of the present invention is actually a mechanically controlled distance-displacement relationship between two or more points of a mechanical linkage. As adapted herein, there is a three support of the wire but it would nevertheless be operative if there were a direct connection between the slide bar 32 and the rod without recourse to the sliding connection with the saddle member on the rod and the fixed connection at the opposite end thereof. However, utilizing the arrangement shown where the outermmost end of the wire member 30 is fixed to the rod handle has advantages over a two point linkage system. It increases, by almost double, the movement of the sliding release bar 32 for the same displacement movement of the rod element and midpost. It also requires less critical placement of the rod with the saddle member when located inside the rod handle. In the final analysis, the longer the stroke movement of the sliding bar member, the less accurate is the requirement for tolerances of the overall system.

The operation of the automatic line release is exactly as described with reference to FIGS. 4 – 7 inclusive of the aforementioned prior patent and the only difference is in the means for controlling the movement of the slide bar member in response to flexure of the rod.

While a preferred embodiment of the invention has been herein shown and described, applicant claims the benefit of a full range of equivalents within the scope of the appended claims.

I claim:

1. An automatic line release apparatus for casting with a spinning rod and reel comprising in combination:
   a spinning rod of resilient material;
   a hollow handle of substantially larger inside diameter than the diameter of the butt portion of said rod;
   means mounting said rod concentrically in said handle to permit flexure of said rod within said handle when casting;
   means for mounting a spinning reel on the exterior of said handle;
   a housing firmly attached to said handle on the opposite side of and forwardly of said reel;
   a trigger mounted in said housing to pivot from a first position extending outwardly of said housing to a second position within said housing and having a line receiving notch in that side of said trigger which is toward the butt of said rod when in said first position; so that line between said reel and the first line guide on the rod may be placed in said notch;

cam means mounted in said housing for holding said trigger in said first position prior to making a cast;

a bar member mounted in said housing for sliding mmovement parallel to the longitudinal axis of said rod, said bar member when moving from its forwardmost to its rearmost position engaging said cam member and moving it out of the path of travel of said trigger from its first to its second position;

a saddle member having an opening therethrough and secured to said rod within said handle and spaced forwardly of said housing, said handle having an opening in the peripheral wall opposite said saddle member; and a resilient wire extending through the opening in said saddle member and having opposite ends attached to the forward ends of said handle and bar member.

2. The combination defined by claim 1 in which said resilient wire is attached at its opposite ends by ball joints.

3. The combination defined by claim 1 in which the point of connection of said resilient wire to said handle is adjustable longitudinally of said handle.

4. The combination defined by claim 1 in which said saddle member is substantially centered with respect to opposite ends of said wire member.

5. A fishing rod for bait casting or spinning comprising:

an elongated tapered rod of flexible resilient material;

a first hollow handle surrounding and spaced radially from the butt portion of said rod;

resilient means positioned within opposite ends of said handle and joining the butt portion of said rod thereto;

a second hollow handle surrounding and spaced radially from said first handle and secured to said first handle adjacent the butt end of said rod only and extending a substantial distance toward the tip of said rod beyond the tip end of said first handle;

the diameter of said first and second handles and the distannce between the ends of said handles being so chosen with respect to the bending characteristics of said rod that when said rod is fully flexed, it remains out of contact with the inner surfaces of either of said handles, whereby the entire length of said rod is available for energy storage and release during casting.

* * * * *